United States Patent [19]

Miller et al.

[11] Patent Number: 5,276,622
[45] Date of Patent: Jan. 4, 1994

[54] SYSTEM FOR REDUCING SUSPENSION END-STOP COLLISIONS

[75] Inventors: Lane R. Miller; Charles M. Nobles, both of Fuguay-Varina; Douglas E. Ivers, Cary; Mark R. Jolly, Davis, all of N.C.

[73] Assignee: Lord Corporation, Erie, Pa.

[21] Appl. No.: 782,501

[22] Filed: Oct. 25, 1991

[51] Int. Cl.⁵ .............................................. B60G 17/00
[52] U.S. Cl. ............................. 364/424.05; 280/707; 280/840
[58] Field of Search ................... 364/424.05; 280/707, 280/840, DIG.; 188/282,299

[56] References Cited

U.S. PATENT DOCUMENTS

| | | | |
|---|---|---|---|
| 4,836,029 | 6/1989 | Skala et al. | 73/799 |
| 4,836,342 | 6/1989 | Wolfe | 188/319 |
| 4,838,392 | 6/1989 | Miller et al. | 188/277 |
| 4,887,699 | 12/1989 | Ivers et al. | 188/378 |
| 4,898,264 | 2/1990 | Miller | 188/275 |
| 4,907,680 | 3/1990 | Wolfe et al. | 188/299 |
| 4,921,272 | 5/1990 | Ivers | 280/707 |
| 4,949,262 | 8/1990 | Buma et al. | 364/424.05 |
| 4,949,573 | 8/1990 | Wolfe et al. | 73/118.1 |
| 4,953,089 | 8/1990 | Wolfe | 364/424.05 |
| 4,969,632 | 11/1990 | Hodgson et al. | 267/140.1 |
| 4,972,929 | 11/1990 | Ivers et al. | 188/317 |
| 4,993,523 | 2/1991 | Schwemmer et al. | 188/299 |
| 5,004,079 | 4/1991 | Ivers et al. | 188/282 |
| 5,060,968 | 10/1991 | Edahiro et al. | 280/707 |
| 5,062,660 | 11/1991 | Satoh et al. | 280/707 |
| 5,162,996 | 11/1992 | Matsumoto et al. | 364/424.05 |
| 5,168,448 | 12/1992 | Matsumoto et al. | 364/424.05 |
| 5,172,929 | 12/1992 | Butsuen et al. | 364/424.05 |

OTHER PUBLICATIONS

Experimental Comparison of Passive Semi-Active On/Off, and Semi-Active Continuous Suspensions, D. E. Ivers and L. R. Miller, Nov. 1989, pp. 1-7.
The Experimental Performance of an "On/Off" Active Damper, E. J. Kraznicki, 1981, pp. 1-7.
An Introduction to Semi-Active Suspension Systems, L. R. Miller, 1986, pp. 1-26.
The Active Damper-A New Concept for Shock and Vibration Control, M. J. Crosby, pp. 119-133.
Co-pending Application "System for Controlling Suspension Deflection", Ser. No. 07/799,501, filed Nov. 27, 1991.

*Primary Examiner*—Gary Chin
*Attorney, Agent, or Firm*—Randall S. Wayland; Richard K. Thomson

[57] ABSTRACT

A method and apparatus for reducing suspension end-stop collisions is disclosed. The method and apparatus controls the operation of an isolation system having an adjustable damper assembly interconnecting relatively movable members to attenuate the transmission of forces therebetween, in which relative movement of the members is restricted beyond a certain limit by one or more end stops. Sensors monitor the conditions of the system such as the displacement, velocity and acceleration of the members. Damper command signals are provided to the damper assembly to adjust the damping characteristics of the assembly, as determined by the data, in accordance with both a primary control policy and an override control policy. The override control policy alters the damper command signals as necessary to increase the damping characteristics of the damper assembly at times when the isolation system is likely to meet or exceed the end stops in order to minimize the incidence of end-stop collisions.

14 Claims, 3 Drawing Sheets

SYSTEM FOR REDUCING SUSPENSION END-STOP COLLISIONS

FIELD OF THE INVENTION

The invention relates generally to vehicle suspension control systems and particularly to a system for reducing suspension end-stop collisions for relatively movable members interconnected by a semiactive damper assembly.

BACKGROUND OF THE INVENTION

Isolation systems such as vehicle suspensions or the like serve to reduce the shock and vibratory forces between relatively movable members such as a vehicle body (a sprung mass) and a support or vehicle wheel (an unsprung mass). Forces transmitted between the members are attenuated using dampers that comprise piston and cylinder assemblies having variable volume chambers interconnected by an orifice or passageway through which fluid is displaced, and throttled, according to the size of the orifice.

Prior art isolation systems may be characterized as passive, fully active or semiactive. A passive isolation system, such as the spring-dashpot combination used in most automobiles, typically provides good isolation in a certain frequency range of operation, but is subject to amplified excitation in passing through its resonant or natural frequency such that its damping forces will at times amplify, rather than attenuate, force transmission between the interconnected (sprung and unsprung mass) members. More particularly, a passive isolation system is often incapable of providing damping forces sufficient to appropriately attenuate the excitation of the sprung mass member. Other passive isolation systems provide good control of the sprung mass isolation at the natural frequency of the suspension, while imparting too much damping force between the interconnected members at other frequencies, resulting in a "harsh" ride.

Fully active isolation systems differ from passive systems in that they employ an external power source or force generator for supplying energy in a controlled manner to counteract vibrational forces. As a result, the damping coefficient and hence the effective natural frequency of a suspension employing a fully active damper can be continually adjusted to the desired value to provide isolation superior to that of passive devices. However, fully active systems require a large auxiliary power source and are not sufficiently responsive at high operating frequencies due to inadequacies of such equipment to respond rapidly to control signals.

Semiactive isolation systems are defined as those which require no external energy other than that needed to actuate valves, sensors and controls, yet are capable of providing for rapid changes in the damping coefficient of the damper interconnecting the members so as to optimize the attenuation of forces between the members. A semiactive system can create a force opposing motion, but not in the direction of motion. Thus, the term "semiactive" refers to control systems which are only capable of removing energy from a system. Semiactive systems are nonetheless capable of performance approaching that of a fully active system when operated pursuant to a suitable control policy, and in particular those control policies which emulate a hypothetical "skyhook" damper as described in Karnopp, D. C. et al., "Vibration Control Using Semiactive Force Generators," ASME Paper No. 73-DET-123 (June 1974), incorporated herein by reference. Semiactive dampers and control policies for them, are disclosed in Karnopp, U.S. Pat. No 3,807,678; Miller et al., U.S. Pat. Nos. 4,821,849, 4,838,392 and 4,898,264; Boone, U.S. Pat. No. 4,936,425; and Ivers, U.S. Pat. No. 4,887,699, all owned by the assignee of the present invention. The disclosures of the foregoing patents are incorporated herein by reference.

Semiactive dampers may be either of the "off/on" type, of the "orifice-setting" type, or of the "force-controlled" type. An "off/on" semiactive damper is switched, in accordance with the dictates of a suitable control policy, between alternative "on" and "off" damping states or conditions. In the "on" state, the damping coefficient of the damper is of a preselected, relatively high magnitude. The term damping coefficient as used herein is understood to mean the relationship of the damping force generated by the damper to the relative velocity across the damper, which relationship is not necessarily linear. In its "off" state, the damping coefficient of the damper is approximately zero or of a relatively low magnitude sufficiently greater than zero so as to discourage "wheel hop". An orifice-setting semiactive damper is also switched during operation between an "off" state, where the damping coefficient is approximately zero or of some relatively low magnitude, and an "on" state. However, when a orifice-setting semiactive damper is in its "on" state the damping coefficient thereof may be and normally is changed between a large (theoretically infinite) number of different magnitudes. The magnitude of the damping coefficient is typically determined by the diameter setting of the valve orifice in the damper.

A "force-controlled" damper, in theory, is capable of creating any desired dissipative force in the "on" state independent of the relative velocity across the damper. This is in contrast to the aforementioned "off/on" and "orifice-setting" dampers in which the damping force in the "on" state depends on the relative velocity across the damper. A force-controlled damper can either be realized by use of feedback control or by use of pressure control valves. In the "off" state the force-controlled damper will command the valve to the full-open position in which the damping coefficient is approximately zero or of some relatively low value.

Although the foregoing semiactive isolation systems offer significant performance advantages over other types of isolation systems they have been known to experience difficulties when subjected to large, abrupt input disturbances such as those encountered on rough terrain or upon the landing of an aircraft, for example. Excessive vehicle body motions and suspension travel can often result in damaging or uncomfortable force inputs to the vehicle when the suspension reaches its end of travel in either a retracted or extended condition so as to impact the mechanical end stops of the suspension. The aforesaid suspension end-stop collisions are often referred to as "bottoming out" of the suspension, when such occurs in the retracted condition. End-stop collisions result in degraded isolation of the vehicle body by significantly increasing the root-mean-square (RMS) accelerations thereof and further place undue stress on system components to such an extent as to shorten their useful life.

Semiactive isolation systems employing an above-described "skyhook" control policy or a derivative thereof, tend to increase the average range of suspension deflection to provide "smoother" ride characteristics and therefore can, under certain conditions, actually increase the incidence of suspension end-stop collisions. This tendency is discussed in Miller, "Tuning Passive, Semiactive and Fully Active Suspension Systems," Proceedings of the 27th CDC of IEEE, Vol. 3, 1988 and in Ivers et al., "Experimental Comparison of Passive, On/Off Semiactive and Continuous Semiactive Suspensions" SAE Paper No. 892484, Dec. 7, 1989.

The incidence of suspension end-stop collisions could be reduced or even eliminated by use of a very stiff damper with a high damping coefficient. However, this would defeat the performance advantages of semiactive control by unnecessarily limiting the range of suspension deflection for the given range of motion of the suspension and unacceptably degrade the isolation of the vehicle.

Various types of spring and elastomeric bumpers have been designed to reduce the severity of end-stop collisions. Typically, these bumpers or other means are designed to be internal to the damper cylinder and provide for hydromechanical or pneumatic cushioning after the piston has approached closer to a particular end-stop than a prescribed distance. Examples of such devices are disclosed in Mourray, U.S. Pat. No. 4,527,674 and Kaneko, U.S. Pat. No. 4,700,611. Other arrangements are provided which progressively increase damping as the damper nears its end of travel, such as disclosed in Sorgatz et al., U.S. Pat. No. 4,004,662; Wossner, U.S. Pat. No. 4,768,629; and Hauswirth, U.S. Pat. No. 3,885,654.

A limitation of the aforementioned stroke dependent dampers is that they tend to reduce the available range of suspension deflection which adversely affects their ability to provide optimized isolation of the vehicle. Also, the end-stop cushioning or other means is permanently installed in the damper and may not be overridden, rendering the damper unsuitable for the cooperative implementation of semiactive control functions. The aforementioned dampers further are limited in that they do not anticipate and avoid end-stop collisions according to variable quantities external to the damper such as mass, velocity and input displacement. All of the above result in reduced isolation performance.

SUMMARY OF THE INVENTION

The foregoing problems are solved and a technical advance is achieved by the present invention which provides a method and apparatus for reducing the incidence and severity of suspension end-stop collisions in semiactive isolation systems without degrading their performance. The method and apparatus controls the operation of an isolation system having an adjustable damper assembly interconnecting relatively movable members to attenuate the transmission of forces therebetween in which relative movement of the members is restricted beyond a certain limit by one or more end stops. The conditions of operation of the isolation system are monitored by sensors or the like to produce data indicative of relative displacement, relative velocity, acceleration or other conditions. Damper command signals are provided to the damper assembly to adjust the damping characteristics of the assembly, as determined by the data, in accordance with both a primary control policy and an override control policy. The override control policy alters the damper command signals as necessary to increase the damping characteristics of the damper assembly at times when the isolation system is likely to meet or exceed the end stops in order to minimize the incidence of end-stop collisions.

The primary control policy receives data from the sensors and produces primary command signals to be used for the attenuation of forces between the members in accordance with the preselected instructions of the control policy. Preferably, a semiactive control policy simulating a hypothetical skyhook damper is utilized. The override control policy also receives data from the sensors for producing override command signals to be used for reducing end-stop collisions in accordance with the preselected instructions of the override control policy. The override control policy includes means for making an error value calculation based on the data received which indicates when end-stop collisions are likely to occur. The error value is supplied to a feedback control means for generating a force value which is a function of the error value. The force value determines the override command signal. A summing device receives the primary and override command signals and produces damper command signals which are a function of the primary and override signals for adjusting the damping characteristics of the damper assembly. A preferred function for determining the damper command signals is to set the damper command signals equal to the greater of the primary and override command signals, so as to provide an increased damping coefficient at times when end-stop collisions are likely and thereby minimize their occurrence.

The system of the present invention may be utilized for isolation systems having damper assemblies of both the force-controlled and orifice-setting types.

BRIEF DESCRIPTION OF THE DRAWINGS

The novel features believed characteristic of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENT

Figure 1:
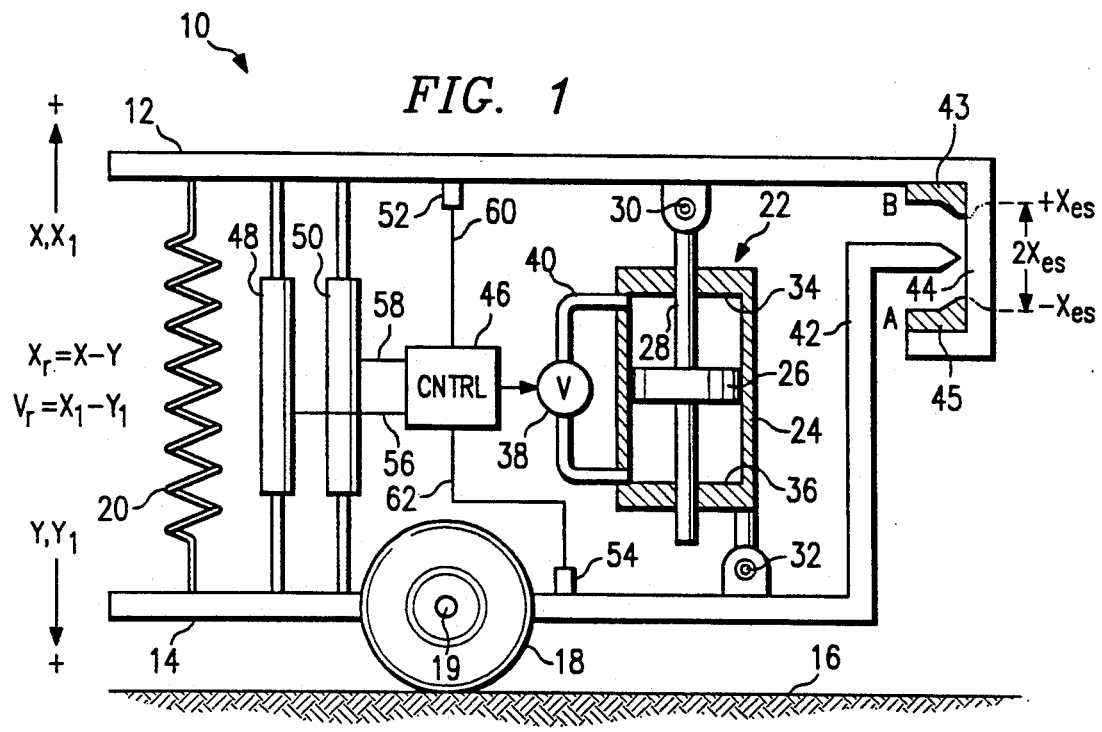
FIG. 1 is a schematic view of a force attenuating suspension or similar mounting system which includes a semiactive damper assembly controllable in accordance with the present invention.

Referring to FIG. 1 of the drawings, reference numeral 10 designates a two degree of freedom suspension or similar force-attenuating mounting system incorporating features of the present invention. The system 10 interconnects vertically-spaced and relatively movable supported and supporting members 12, 14. By way of example, the members 12, 14 may respectively be the body and unsprung mass components of an automobile, aircraft or other motor vehicle that is supported upon a road or other surface 16 by one or more conventional, resiliently deformable tire members 18, only one of which is shown. An axle 19 supports the tire member relative to the supporting member 14. A primary function of the system 10 is to isolate the supported member 12 insofar as possible from vibratory and/or other forces transmitted by the member 14 by input disturbances such as road-surface irregularities, abrupt impacts, or the like.

A primary suspension spring 20 and a semiactive damper assembly 22 extend in substantially parallel relationship to each other between the members 12, 14 and are connected to the members. The damper assembly 22 is of the hydraulic piston and cylinder type having a hydraulic cylinder 24 enclosing a piston 26. A piston rod 28 is connected to the piston 26 and is secured to the supported member 12 by a suitable connector including, for example, a bushing 30 formed by elastomer or similar resilient, compliant material. The cylinder 24 is secured to the supporting member 14 by a suitable connector which includes, for example, a deformable bushing 32, also formed of elastomer or similar resilient, compliant material. Relative vertical movement between the members 12, 14 causes relative vertical movement between the cylinder 24 and the piston 26, which in turn displaces a hydraulic fluid (not shown) between upper and lower variable volume fluid chambers 34, 36 of the cylinder 24, via an electrically or otherwise rapidly adjustable control valve 38 forming part of a hydraulic circuit 40 interconnecting such chambers. Such circuitry is often contained wholly within the piston. The rod 28 of the damper assembly 22 illustratively extends through both of the fluid chambers 34 and 36 such that the amount of fluid displaced between the chambers is the same irrespective of whether the displacement is produced by compression or by extension of the assembly 22. Alternatively, an accumulator or the like (not shown) is connected to the chamber 36.

The damper assembly 22 is of the continuous force-controlled type such as that utilized in Ivers et al., "Experimental Comparison of Passive, Semi-active On/Off and Semi-active Continuous Suspensions", SAE Technical Paper Series No. 892484, November 1989. The damper assembly 22 is rapidly switchable between an "off" damping state or condition in which the damping coefficient of the damper is of relatively low magnitude (which in some cases is approximately zero), and an "on" state wherein a desired force is created independently of the velocity across the damper. Changes in the damping state of the damper assembly 22 result from control signals that are imparted to an actuator (not shown) of the valve 38 and that cause the valve to throttle or restrict fluid flow through the valve to the extent indicated by the signals. The valve 38 may be of a mechanical, electrorheological, or any other type capable of rapid operation in the foregoing manner. It is understood that the assembly 22 may be commanded to produce a desired force regardless of the relative velocity of the system, although some hardware limitations do apply.

In an alternative embodiment, it is understood that the damper assembly 22 may be a simple orifice-setting damper. An orifice-setting damper is limited in that it is unable to produce an arbitrary force on command, and is only capable of responding to a valve position command. Typically many valve positions are required to adequately implement the proposed end-stop override.

Two interlocking members 42 and 44 are respectively connected to the members 12, 14 and schematically represent the limits of suspension travel for the system 10. The reference letter "A" represents the extension ("rebound") end stop of the system 10 which is reached when the members 12, 14 reach full extension away from each other. The reference letter "B" represents the retraction ("jounce") end stop of the system 10 which is reached when the members 12, 14 are in a fully retracted or compressed position with respect to each other. Snubbers 43, 45 are respectively located at end stops A, B. The snubbers 43, 45 are usually resilient, deformable members made of elastomeric material or the like and serve to cushion the impact of the members 42, 44 when engaging the end stops A, B.

The designations "X", "X1", respectively designate the absolute vertical displacement and the absolute velocity of the supported member 12, it being arbitrarily indicated that these are positive when in an upper direction and thus are negative when in a downward direction. The same sign convention in the letters "Y", "Y1" similarly designate the absolute vertical displacement and the absolute velocity of the supporting member 14. When the system 10 is at rest, X, X1, Y and Y1 are all zero. The designation "Xr" indicates the relative displacement of the system 10 and is given by the difference $X-Y$. When the system 10 is at rest, the relative displacement Xr is zero. The designation "Xes" represents the relative displacement of the system 10 in full extension. The designation "$-$Xes" represents the relative displacement of the system 10 in full retraction. Here it is assumed for simplicity of illustration that the equilibrium position is midway between end stops. The designation "Vr" represents th relative velocity of the system 10 and is given by the difference $X1-Y1$.

A controller 46, subsequently discussed in detail, produces electronic control signals for controlling the valve 38 of the damper assembly 22 in order to instantaneously select the damping coefficient of the assembly for best isolation of the supported member 12. The controller 46 operates pursuant to a preselected control policy, as described further below, and receives input data from selected ones of a plurality of motion sensors 48, 50, 52 and 54 associated with the members 12, and 14. The sensors 48, 50 directly detect the instantaneous relative displacement Xr and the instantaneous relative velocity Vr, respectively, of the members 12, 14. The data from the sensors 48, 50 is sent via lines 56, 58 to the controller 46. The sensor 52 detects the absolute vertical acceleration "a" of the member 12 and sends this data via line 60 to the controller 46. The acceleration data from the sensor 52 may be utilized to derive displacement, absolute velocity and/or relative velocity data. Since the data produced by the sensors 48, 50 can also be derived from the data produced by the acceleration sensors 52, 54, it will be appreciated that not all of the illustrated sensors need be employed or provided in association with the system 10. It will also be understood that pressure-sensitive and other types of sensors might be used instead of or in addition to the illustrated ones. In addition, the preselected control policy might also employ sensors to detect brake pedal position, speed, steering angle, attitude, etc.

Figure 2:
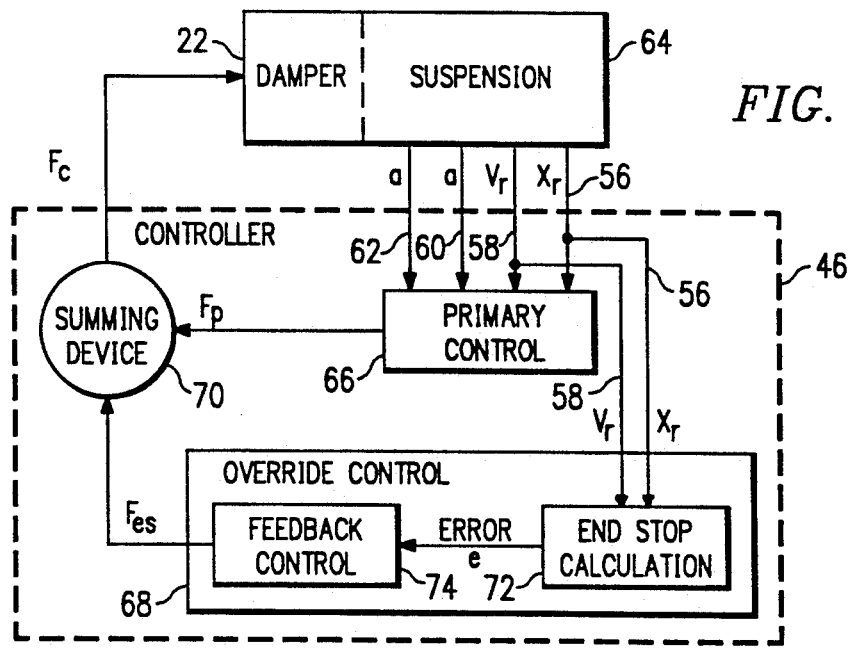
FIG. 2 is a functional block diagram of the system of FIG. 1 depicting the details of the controller.

Referring to FIG. 2, there is shown a functional block diagram of the system 10 illustrating details of the controller 46. Suspension block 64 represents the dynamic elements of the system 10, including the members 12, 14, the spring 20, the damper assembly 22 and the sensors 48, 50, 52 and 54. The controller 46 receives electrical signals from the sensors in the suspension block 64 indicative of the displacement, velocity and acceleration of the members 12, 14, as discussed above, on the lines 56, 58, 60 and 62. The controller 46 processes the sensor data in real time using semiactive control techniques to supply damper command force signals (Fc) to the damper assembly 22. The signals Fc are used to vary the amount of damping of the assembly 22 in order to provide improved isolation and handling of the supported member 12. While not shown, it is understood that the controller 46 may be embodied as analog circuitry or as a digital computing system.

The controller 46 includes a primary control block 66, an override control block 68 and a summing device 70. The primary control block 66 implements a primary control policy, as discussed further below, to supply primary control command force signals (Fp) to the summing device 70 based upon the signals received from the suspension block 64 on one or more of the sensor lines 56, 58, 60 and 62. The override control block 68 receives from the suspension block 64 signals on the sensor lines 56, 58 indicative of the relative velocity Vr and the relative displacement Xr of the members 12, 14. The override control block 68, as discussed in detail below, implements a unique override control policy for supplying end-stop override command force signals (Fes) to the summing device 70. The summing device 70 combines the Fp signal and the Fes signal and, using appropriate gain devices or other circuitry (not shown), supplies the damper command force signal (Fc) to the damper assembly 22. During normal operation of the system 10, in one preferred embodiment of the present invention, the damper command force signal Fc is determined solely by the primary control command force signal Fp. The end-stop override command force signal Fes contributes to the damper command force signal Fc only at times when the primary control command force signal Fp is unable to cause the damper assembly 22 to generate a force necessary to avoid an impending end-stop collision. The override control block 68 logically determines whether an end-stop collision is likely to occur, and if so, overrides the primary control block 66 by producing an end-stop override command force signal Fes. The override control block 68 therefore only intervenes when necessary to prevent end-stop collisions but otherwise allows the primary control block 66 to govern operation of the system 10.

Alternatively, during normal operation of the system 10, the damper command force signals Fc could be determined solely by the end-stop override command force signals Fes. Only at times when an end-stop collision was impending would an increase in damping be commanded. At times when the actual relative velocity Vr were less than the maximum allowable relative velocity Vrm, the end-stop override control policy could reduce the commanded damper force signal Fc. The effect would be to minimize the acceleration experienced by the passengers by maximizing the relative displacement Xr (the RMS value of the relative displacement Xr would approach 0.707 Xes). Such a control policy might be useful for off-road vehicles where large road disturbances are present and suspension travel is important for reducing the perceived harshness of the ride.

The primary control block 66 is preprogrammed so as to operate in accordance with a standard or modified version of any one of a plurality of semiactive damper control policies. One known control policy emulates a skyhook damper and is based upon the sign of the product of the relative velocity (X1−Y1) between the supported and the supporting members 12, 14 times the absolute velocity X1 of the supported member. More specifically, the standard version of the control policy dictates that the damping coefficient of the damper assembly 22 be approximately zero or of other preselected relatively low magnitude when the product X1 (X1−Y1) is less than zero, i.e., when the sign of the aforesaid product is negative or minus. At those times when the product X1 (X1−Y1) is greater than zero, i.e., when the sign of the product is positive or plus, the standard control policy causes the damper to be "on" and also then so varies the damping coefficient of the damper as to cause its damping forces to be proportional to the absolute velocity X1 of the supported member 12 of the system 10. In its implementation of this control policy, or a modified version of it, the primary control block 66 may obtain the necessary data with respect to the relative velocity Vr from the sensor 48 or may derive all of the necessary data from that supplied by the sensor 52 and 54, or from some other source.

Another semiactive control policy which may be utilized by the primary control block 66, in its standard or modified form, also emulates a skyhook damper and is based upon the sign of the product of the relative velocity (X1−Y1) of the supported and supporting members 12, 14 times the relative displacement (X−Y) of such members. The standard version of this control policy dictates that the damping coefficient of the damper assembly 22 be approximately zero or of the other preselected relatively low magnitude when the product (X−Y) (X1−Y1) is greater than zero, i.e., when the sign of the product is positive. When the sign of the aforesaid product is negative or minus, i.e., when the product (X−Y) (X1−Y1) is less than zero, the standard control policy causes the damping coefficient of the damper assembly 22 to be such as to cause generation of damping forces proportional to the relative displacement Xr of the supported and supporting members 12, 14. The relative displacement and relative velocity data needed for implementation of the control policy may be obtained directly from the sensors 48, 50 or, alternatively, may be derived from the data produced by either of the acceleration sensors 52, or 54 or by either sensor 48, or 50. Other control policies are also contemplated.

The override control block 68 implements an end-stop override control policy which effectively overrides the aforementioned primary control policy to produce an increased damper force when necessary to avoid end-stop collisions. An end-stop calculation block 72 logically determines when the instantaneous relative velocity Vr of the members 12, 14 exceeds a predetermined maximum relative velocity value "Vrm," above which an end-stop collision may occur. The end-stop calculation block 72 generates an error value "e," in a manner to be described below, which represents the difference between the instantaneous relative velocity Vr and the maximum allowable relative velocity Vrm and furnishes it to a feedback control block 74. The feedback control block 74 receives the error value e and utilizes it to generate the end-stop override command force Fes using feedback control techniques as described below.

Figure 3:
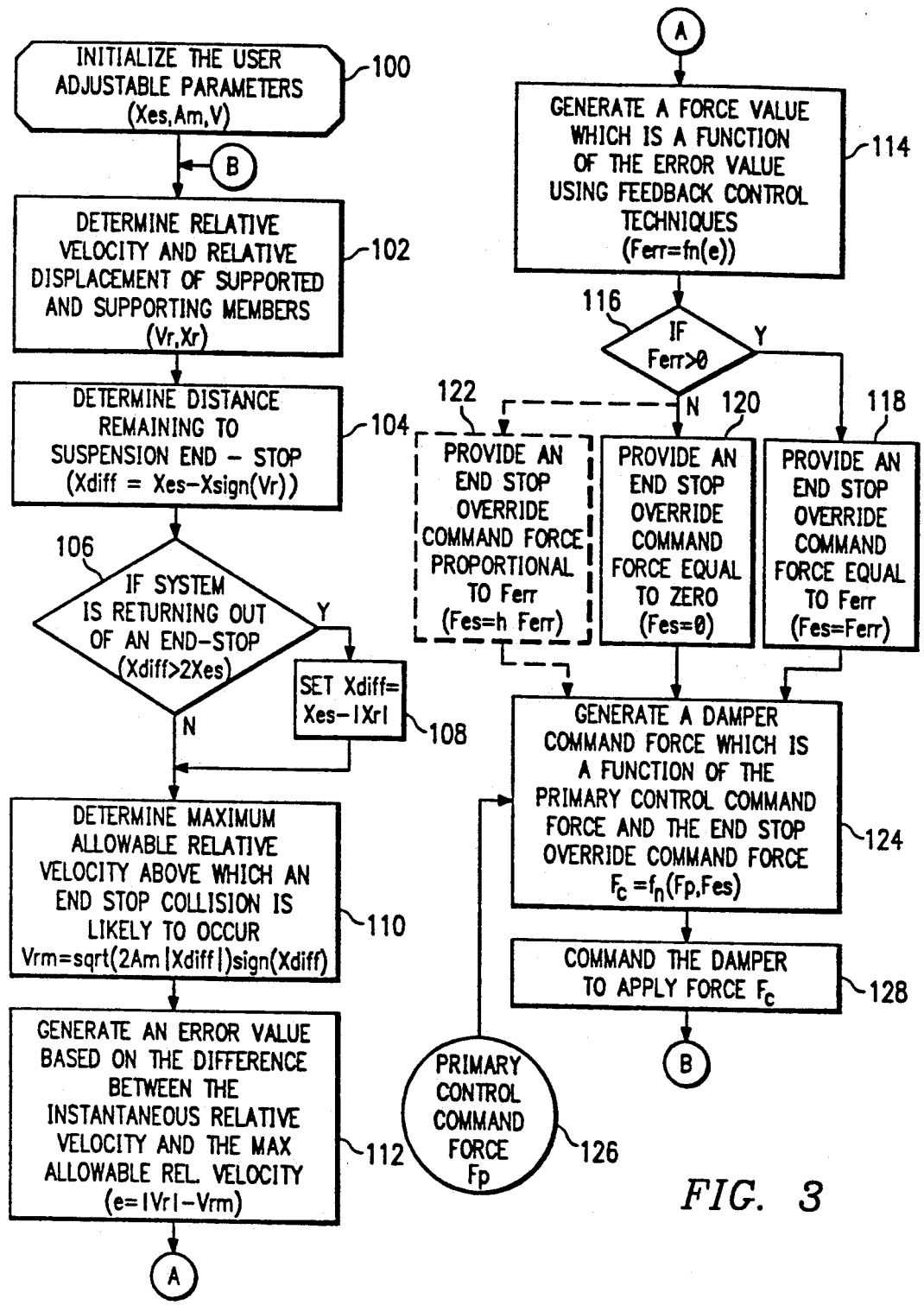
FIG. 3 is a flow chart illustrating methods of the present invention for the system of FIG. 1 in which the damper assembly is of the force-controlled type; and, FIG. 4 is a flow chart illustrating methods of the present invention for the system of FIG. 1 in which the damper assembly is of the orifice-setting type.

FIG. 3 depicts a flow chart which further describes the end-stop override control policy of the override control block 68. The functions in FIG. 3 may be executed by computer program instructions stored in the controller 46. The actual program code to perform these functions may be generated using conventional programming techniques, and is therefore omitted herein for clarity.

In step 100, parameters of the system 10 are initialized which vary depending on the dimensions, damper configuration and operating environment of the system. These parameters include, for example, the available relative displacement from equilibrium of the suspension, represented by the designation "Xes"; the maximum allowable acceleration of the system 10 represented by the designation "Am"; and the feedback gain coefficient, represented by the designation "V". The available relative displacement Xes is the suspension travel distance from an equilibrium or zero position to the extension end stop A. In the opposite direction, the available relative displacement $-$Xes is the suspension travel distance from the equilibrium or zero position to the retraction end stop B. Thus, the total suspension travel distance is equal to 2Xes. The maximum allowable acceleration, Am, is the maximum allowable absolute vertical acceleration of the support member 12 and is set by the ride engineer to an arbitrary value to maintain the desired passenger comfort. The value of Am determines, in conjunction with other factors, the breadth of conditions in which a control error value ("e") is generated. The coefficient V determines how much force is applied for a given error. Other parameters may also need to be initialized, depending upon the particular feedback control techniques employed as discussed below. The foregoing parameters are typically obtained empirically.

Once the above parameters are initialized, the override control policy may proceed to perform its remaining functions in a repeat loop whereby the damper command force signal Fc is determined and provided to the damper assembly 22 on the order of once every few milliseconds. In step 102, the relative velocity Vr and the relative displacement Xr of the supported and supporting members 12, 14 are determined. The relative velocity Vr of the members 12, 14 may be calculated by subtracting the absolute velocity Y1 of the supporting member 14 from the absolute velocity X1 of the supported member 12 as given by the equation Vr=X1−Y1. Similarly, the relative displacement Xr of the members 12, 14 may be determined by subtracting the absolute displacement Y of the supporting member 14 from the absolute displacement X of the supported member 12 as given by the equation Xr=X−Y. It is understood that these values may be alternatively calculated using single sensors or by other means. In another embodiment, Xr may be determined by integrating Vr; or Vr from differentiating Xr.

In step 104 the distance remaining to the approaching end stop is determined. This distance value is represented by the designation "Xdiff." Xdiff thus provides an indication of the remaining stopping distance available to avoid an end-stop collision. If the system 10 is extending, the distance remaining Xdiff is the distance from the instantaneous relative displacement Xr to the extension end stop A. Alternatively, if retracting, Xdiff is the distance remaining from the instantaneous relative displacement Xr to the end stop B. The distance remaining Xdiff is determined by the equation Xdiff=Xes−Xr sign (Vr), where Xes is the available suspension displacement, Xr is the current position or instantaneous relative displacement of the members 12, 14, and sign(Vr) is the sign function of the relative velocity. If the relative velocity Vr is a positive value, sign(Vr) will equal one (1). If the relative velocity Vr is a negative value, sign(Vr) will equal minus one ($-1$). If the relative velocity Vr is zero, sign(Vr) is equal to zero (0). Sign(Vr) thus provides an indication of which end stop A or B is being approached. When approaching either end stop from equilibrium position, the values for the instantaneous displacement Xr and the relative velocity Vr will have the same sign, such that the product Xr sign (Vr) subtracted from Xes will cause the value of Xdiff to be positive and to go to zero at either end stop A or B.

In step 106, a determination is made whether the system 10 has encountered an end-stop collision and has passed beyond the end-stop position (either A or B) so that it has been cushioned by deflection of the resilient snubber and is returning toward equilibrium. It is understood that even when the override control policy is being implemented as described herein, there may be rare occasions when the input disturbances to the system 10 are so great that an end-stop collision is unavoidable due in part to limited peak damper force. In such instances, it has been determined that the maintenance of a high damping state is desirable, in most applications, when the system 10 is returning out of the snubber, in order to dissipate the energy stored in the snubber. One way to accomplish this result is to ensure that the sign of Xdiff is negative whenever the snubber is deflected. The reason for requiring a negative value for Xdiff in such instances so as to produce a high damping force will be apparent in view of the error value calculation discussed below. Step 106 determines whether the system 10 is returning out of the snubber by comparing the distance remaining Xdiff to the end stop with the available displacement of the system in both directions, given by 2Xes. Thus, if Xdiff is greater than 2Xes, the system has exceeded the limits of one of the suspension end stops and is heading toward the other end stop. If Xdiff is not greater than 2Xes, control proceeds to step 110, discussed below. However, if Xdiff is greater than 2Xes, control proceeds to step 108. Step 108 alters Xdiff by letting Xdiff=Xes−|Xr|. By performing this operation, Xdiff will be a negative value so as to cause a high damping state when the below described error value is used to generate an end-stop command force Fes.

Step 110 operates to determine the maximum allowable relative velocity "Vrm" above which an end-stop collision is likely to occur. The maximum allowable relative velocity Vrm is determined by the kinematic relationship Vrm=sqrt(2Am|Xdiff|)sign(Xdiff). The parameter "Am" represents the maximum allowable constant deceleration for the system 10 and is preselected by the ride engineer to an arbitrary value as necessary to maintain the desired passenger comfort. The distance remaining to the end stop Xdiff, for the current instant in time, was previously calculated in either step 104 or step 108 above. The function, sign (Xdiff), is necessary to account for the existence of the two end stops A and B, and provides for increased damping in the event an end-stop has been encountered, as will be described below.

The maximum allowable relative velocity Vr for the given instant in time, above which an end-stop collision is likely to occur, may then be used to generate an error value "e" in step 112. The error value e is based on the difference between the instantaneous relative velocity Vr and the maximum allowable relative velocity Vrm such that if e is a positive value, the calculated end-stop command force Fes will provide an increased damper command force Fc, in the manner to be described below. If the error value e is a negative value, then the primary control command force Fp is not overridden by the override control policy, and the primary control policy dictates the value of the damper command force Fc. The error value e is determined by the expression $e = |Vr| - Vrm$. The absolute value operator for $|Vr|$ is necessary to account for the two possible directions of movement of the system 10. The error value e may then be used, as will be subsequently discussed, to generate a force which is a function of the error value for feedback to the summing device 70.

Additional functionality arises from the calculation of the error value e using the equations $e = |Vr| - Vrm$ and $Vrm = sqrt(2Am|Xdiff|)sign(Xdiff)$. This additional functionality is provided by the element sign(Xdiff) at times when the system 10 passes one or the other of the end stops A or B and deflects the snubber 43 or 45. At the time the system 10 is moving into and deflecting the snubber 43 or 45, Xdiff passes through zero and becomes negative. As a result, the maximum allowable relative velocity Vrm also passes through zero and becomes negative. Because of the subtraction of this negative value from the absolute value of the instantaneous relative velocity Vr, the error value e is forced to be a positive value. Therefore, when the system 10 is deflecting and moving into the snubber 43 or 45 the control policy will force an increase in damping. This functionality provides for high damping even as Xdiff becomes negative.

When the system 10 is returning out of the snubber 43 or 45, its relative velocity changes direction. Accordingly, the sign of Xdiff as defined in block 104 would normally change to be positive, so that the allowable relative velocity Vrm also would change sign. The result would be that the error value e would become negative, indicating that no corrective action in the form of increased damping would take place. However, steps 106 and 108, as previously discussed, will permit the sign of Xdiff to remain negative so that a positive error value is created during the time when the system 10 is returning out of the snubber 43 or 45. This aspect of the control policy serves to dissipate the energy stored in the snubber 43 or 45.

At step 114, control proceeds to generate an error force signal "Ferr" which is a function of the error value e, using feedback control techniques designed to drive the error value e to zero. The fact that the error force signal Ferr is generally a function of the error value e as given by the equation $Ferr = Fn(e)$. Example feedback control functions for generating the error force signal Ferr may include proportional functions, derivative functions, integral functions or some combinations thereof. If a derivative feedback function is used, the discontinuities in the error value e due to changes in the direction of the relative velocity Vr must be ignored by the differentiator. One feedback control function for computing the error force signal Ferr is to let the error force signal Ferr be proportional to the error value, that is, let $Ferr = Ve$, where V is a feedback gain coefficient.

Once the error force signal Ferr is determined, control proceeds to step 116. At step 116, a determination is made as to whether or not the error force signal Ferr is greater than zero. If the error force signal Ferr is greater than zero, control proceeds to step 118 to provide an end-stop override command force signal Fes which is equal to the error force signal Ferr. As will be discussed below, the end-stop override command force signal Fes is used to provide an increased damper control force signal Fc in order to avoid impending end-stop collisions. On the other hand, if the error force signal is equal to or less than zero, control proceeds to step 120 whereby an end-stop override command force signal Fes is provided which is equal to zero. Under the circumstances in which the error force signal and hence the end-stop override command force signal Fes is equal to zero, it is understood that the override control policy of the present invention lets the primary control policy command force signal Fp control the damper command force signal Fc, since no end-stop collisions are then likely. Step 122 represents an alternative embodiment of the present invention. Instead of setting Fes equal to zero when Ferr is less than or equal to zero, step 122 sets the end-stop override command force signal Fes equal to the product hFerr, where h represents a constant which, for example, may range from zero to 1. The effect of a nonzero value for h would be to generate an end-stop command force signal Fes which would serve to increase the amount of suspension travel of the system 10 used by the normally running primary control policy without increasing the number of end-stop collisions. This occurs because the primary control command force signal Fp would generally be attenuated whenever an end-stop collision is unlikely by subtraction of hFerr from Fp. Alteration of the primary control policy using an end-stop command force signal Fes proportional to Ferr in this manner may be useful in improving available suspension travel and thus ride comfort when used in conjunction with particular primary control policies.

In step 124, a damper command force signal Fc is generated by the summing device 70 which is a function of the primary control policy command force signal Fp and the end-stop override command force signal Fes. Generally, the foregoing is represented by the equation $Fc = Fn(Fp, Fes)$. The summing device 70 receives the end-stop override command force signal Fes from the override control block 68. Step 126 indicates that the summing device 70 also receives the instantaneous value of the primary control command force signal Fp from the primary control block 66. As previously stated in the preferred embodiment, where no end-stop collisions are likely, the end-stop override command force signal Fes will be equal to zero and the primary control policy will dictate command force signal Fc based upon the primary control policy command force signal Fp. Where Fes is positive, then corrective action in the form of increased damper force is deemed necessary in order to avert an end-stop collision.

The damper command force signal Fc may be any one of a number of functions of the end-stop command force signal Fes and the primary control command force signal Fp whereby Fes and Fp are combined in some manner depending on the vehicular application. For example, the two values might be added or combined in a preselected ratio. A preferred option in most cases would be to use whichever is largest such that Fc is equal to the greater of Fes and Fp, as represented by the equation $Fc = Max(Fes, Fp)$. The damper command force signal Fc may also be a combination of the two signals Fes and Fp, as represented by the function $Fc = Fp + Fes$. Where Fes is a positive quantity or by the function $Fc = Fp + hFerr$, where Ferr is a negative quantity. Yet another function may be contemplated as represented by the equation $Fc = GFp + (1-G)Fes$. In this equation, G is a constant representing the desired ratio of the two signals Fp and Fes. Here it is contemplated that G might be inversely proportional to the RMS value of the relative displacement Xr. Thus, for example, if the RMS value of the relative displacement were small and G were normalized to one, then the control policy would principally be that of the sky hook. However, if the RMS value of the relative displacement became large, then the control policy would principally be that of the end-stop override.

At step 128, the damper command force signal Fc is sent to the damper assembly 22 and accordingly adjusts the damping force of the assembly 22 to provide semiactive control in which the incidence of end-stop collisions have been eliminated or at least reduced. Control proceeds from step 128 again to step 102. Generally, the rate of execution of this repeat loop will be on the order of once every two to four milliseconds, however, such may vary and depend on the dynamics of the physical system.

Figure 4:
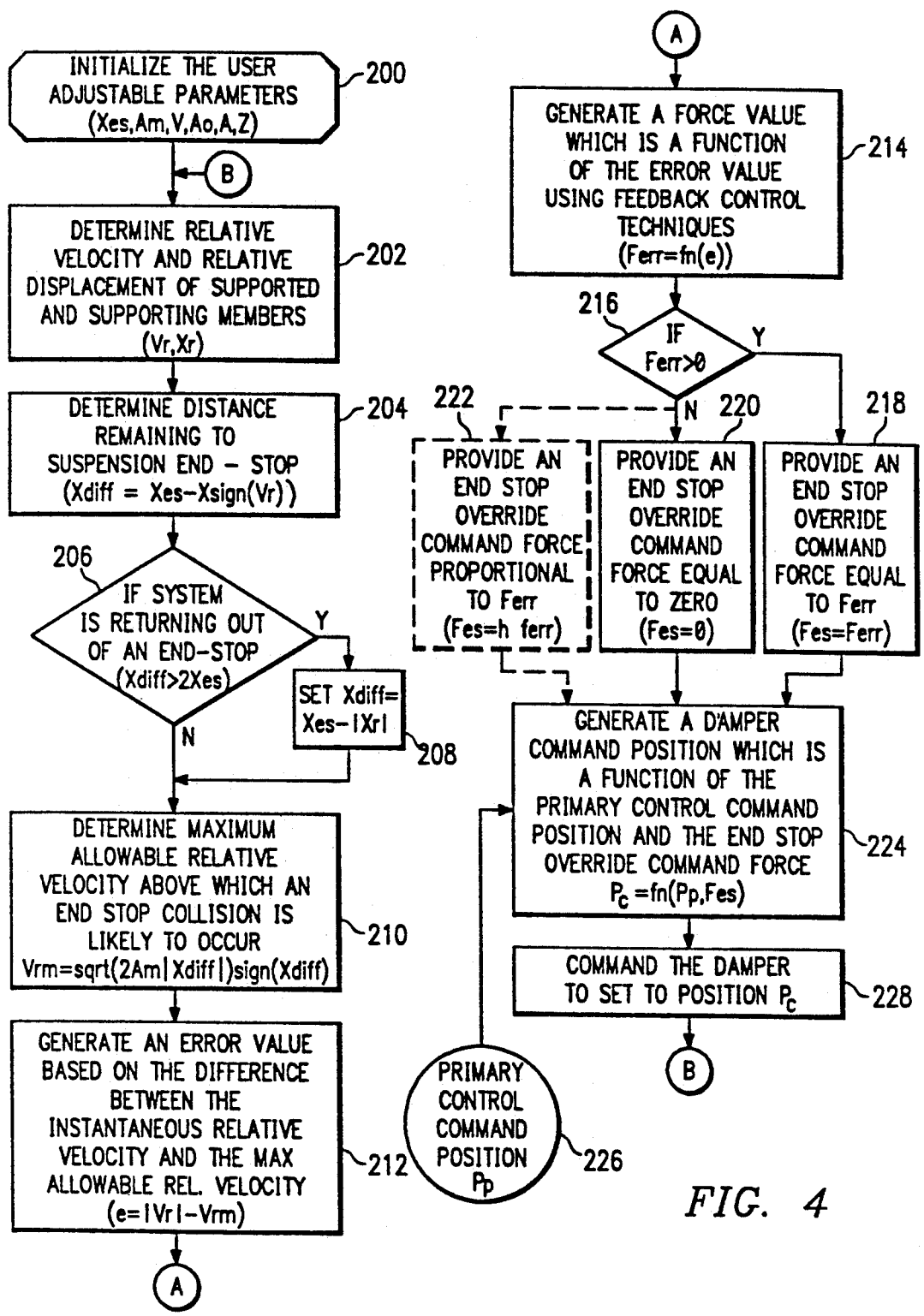

FIG. 4 describes an alternative embodiment of an end-stop override control policy for use in conjunction with damper assembly 22 which is of the orifice-setting type instead of a force controlled damper. As previously described, an orifice-setting damper cannot respond to a force command but instead requires a position command of the valve in the damper. The orifice-setting damper operates by setting a valve in the damper between a fully closed position and a theoretically infinite number of open positions of varying diameter. In step 200, the parameters of the system 10 are initialized which vary depending on the dimensions, damper configuration and operating environment of the system. The parameters include the available relative displacement Xes, the maximum allowable absolute vertical acceleration Am, and the feedback gain coefficient V. The foregoing parameters are the same as those previously discussed with reference to FIG. 3, and therefore will not be described further. For the orifice-setting damper of the present embodiment, additional parameters are also initialized which include "Ao", "A1" and "Z". Ao represents the equivalent fluid leakage area in the valve 38 of the damper assembly 22 when the valve is in the fully closed position. A1 represents the increment in orifice area of the valve 38 for a single step or change in position of the valve of the damper assembly 22. Z represents a term that defines the damper fluid properties such as density and orifice discharge coefficient. The parameters Ao, A1 and Z may be determined by direct or indirect measurements.

Once the above parameters are initialized, the alternative control policy may proceed to perform its remaining functions in a repeat loop as shown in FIG. 4 whereby a damper command position signal "Pc" is determined and provided to the damper assembly 22 on the order of once every few milliseconds. Steps 202–222 of the alternate end-stop override control policy are identical to the corresponding steps 102–122 of the end-stop override control policy previously described with reference to FIG. 3. Accordingly, steps 202–222 will not be described further.

In step 224, a signal Pc representing a damper command position is generated by the summing device 70. The summing device 70 receives the end-stop override command force signal Fes from the override control block 68. Step 226 indicates that the summing device 70 also receives the instantaneous value of a signal Pp representing a command position from the primary control block 66. In the present embodiment the primary control policy provides the damper command position signal Pp to the damper assembly 22 of the orifice-setting type, instead of the primary control command force Fp, as discussed in the previous embodiment.

The damper command position signal Pc is a function of the primary control policy's damper command position signal Pp and the end-stop override command force signal Fes, as represented generally by the equation $Pc = fn(Pp, Fes)$. The damper command position signal Pc may be any one of a number of functions of Pp and Fes, depending on the vehicular application and characteristics of the damper assembly 22. One such function operates to decrease the damper command position signal Pc, proportional to the end-stop override command force signal Fes. As the damper command position signal Pc is decreased, the orifice area of the valve 38 is decreased thus closing the valve to a smaller diameter. The effect of closing the valve in this manner is to increase the damping force beyond that commanded by the primary control policy, thus decreasing the incidence of end-stop collisions. This function may be represented by the equation $Pc = Pp - int(VFes)$. The feedback gain parameter V may be optimized according to the requirements of the system 10. The integer function, $int()$, operates to on the argument, VFes, to truncate the decimal part so that only the integer part is subtracted from Pp. It is understood that when Pc is equal to zero, the valve 38 of the damper assembly 22 is fully closed.

Another function for determining the damper command position signal Pc uses a square-law orifice model of the valve 38 of the damper assembly 22 to translate the end-stop override command force signal Fes into a corresponding valve position signal "Pes." The square-law orifice model converts the command force signal Fes into the valve position signal Pes based on characteristics of the damper assembly 22 as determined by the constants Ao, A1 and Z. The square-law orifice model is given by the equation:

$$Pes = int[(Z|Vr|)/(A1 Sqrt(Fes)) - Ao/A1]$$

where Ao, A1 and Z represent the previously described parameters which are respectively, the valve leakage when closed, the valve area increment for a single step in the valve positioner, and fluid properties. The constants Ao, A1, and Z may be determined experimentally and need not be exact for operation of the system 10.

The valve position signal Pes as determined above corresponds to a maximum allowable valve position at the current instant in time, in order to avoid an end-stop collision. Thus, whenever the primary control command position signal Pp is greater than the override valve position signal Pes, the override value position signal Pes should be chosen as the damper command position signal Pc to prevent the end-stop collision. Likewise, when the primary control command position signal Pp is less than the override valve position signal Pes, then the primary control command position signal Pp should be chosen for the damper command position signal Pc. The foregoing may be represented by the equation $Pc = min(Pp, Pes)$. Alternatively, Pes could be used to reduce Pp, which may provide better performance in some applications. This can be represented by the equation Pc=Pp−Pes.

At step 228, the damper command position signal Pc is sent to the damper assembly 22 and accordingly adjust the orifice-setting of the assembly 22 to provide semiactive control in which the incidence of end-stop collisions have been eliminated or at least reduced. Control proceeds from step 228 again to step 202. As before, the rate of execution of this repeat loop will be on the order of once every two to four milliseconds, however, such may vary and depend on the dynamics of the physical system.

Although not specifically illustrated in the drawings, it is understood that additional equipment and structural components will be provided as necessary, and that these and all of the components described above are arranged and supported in an appropriate fashion to form a complete and operative system 10 incorporating features of the present invention.

It is also understood that variations may be made in the present invention without departing from the spirit and scope of the invention. For example, the system 10 may be employed in automobiles, commercial vehicles, military vehicles, or may be used in aircraft or aerospace applications. The system 10 may also be used for improving isolation in stationary systems. It is contemplated that any one of a variety of primary control policies may be used in conjunction with the system 10 for either fully active or semiactive damper assemblies.

Although illustrative embodiments of the invention have been shown and described, a latitude of modification, change and substitution is intended in the foregoing disclosure, and in certain instances some features of the invention will be employed without a corresponding use of other features. Accordingly, it is appropriate that the appended claims be construed broadly and in a manner consistent with the scope of the invention.

What is claimed is:

1. A method for controlling the operation of an isolation system having a damper assembly interconnecting relatively movable members to attenuate the transmission o forces therebetween in which the relative movement of the members in at least one direction is restricted beyond a certain limit by an end stop, said method comprising the steps of:
    monitoring conditions of operation of said isolation system and producing data indicative thereof;
    providing damper command signals to said damper assembly to adjust the damping characteristics thereof in accordance with preselected primary control instructions and as determined by said data;
    altering said damper command signals provided to said damper assembly as determined in accordance with preselected override control instructions in order to change said damping characteristics at times when said system under control of said damper command signals alone will meet or exceed said end stop, thereby minimizing end-stop collisions.

2. The method of claim 1 wherein said preselected override control instructions operate to increase said damping characteristics as required to minimize an end-stop collision.

3. The method of claim 1 wherein said preselected override control instructions operate to decrease said damping characteristics in order to increase suspension travel without increasing the occurrence of said end-stop collisions.

4. The method of claim 1 wherein said damper assembly is of the on/off control type.

5. The method of claim 1 wherein said damper assembly is of the orifice setting type.

6. The method of claim 1 wherein said damper assembly is of the force control type.

7. The method of claim 1 wherein said damper assembly is of the fully active type.

8. A method for controlling the operation of an isolation system having an adjustable damper assembly interconnecting relatively movable members to attenuate the transmission of forces therebetween in which the relative movement of the members in at least one direction is restricted beyond a certain limit by an end stop, said method comprising:
    monitoring conditions of operation of said isolation system and providing data indicative thereof;
    providing primary damper command signals responsive to said data to adjust the damping characteristics of said damper assembly in accordance with preselected instructions;
    calculating an error value responsive to said data to indicate when an increased possibility of end-stop collision is present;
    generating override command signals responsive to said error value; and
    providing altered damper command signals responsive to said primary and override command signals at times when said increased possibility of said end-stop collision is present.

9. Apparatus for controlling the operation of an isolation system having an adjustable damper assembly interconnecting relatively movable members to attenuate the transmission of forces therebetween in which the relative movement of the members in at least one direction is restricted beyond a certain limit by an end stop, said apparatus comprising:
    sensor means for monitoring conditions of operation of said isolation system and for providing data indicative thereof;
    primary control means for receiving said data and for providing primary damper command signals to adjust the damping characteristics of said damper assembly in accordance with a first set of preselected instructions and as determined by said data;
    secondary control means for receiving said data and for altering said primary damper command signals to adjust the damping characteristics of said damper assembly in accordance with a second set of preselected instructions and as determined by said data, at times when an increased possibility of end-stop collisions is present, so as to both minimize the incidence of said end-stop collisions and optimize system isolation.

10. The apparatus of claim 9 wherein said secondary control means further comprises:
    means for calculating an error value responsive to said sensor data to indicate when said increased possibility of said end-stop collisions is present;
    feedback control means responsive to said error value for generating override command signals; and
    summing means responsive to said primary and override command signals for producing said altered damper command signals.

11. Apparatus for controlling the operation of an isolation system having an adjustable damper assembly interconnecting relatively movable members to attenuate the transmission of forces therebetween in which the relative movement of the members in at least one direction is restricted beyond a certain limit by an end stop, said apparatus comprising:

sensor means for monitoring conditions of operation of said isolation system and for producing data indicative thereof;

primary control means for receiving said data and for producing primary command signals to be used for the amplification and attenuation of forces between the members in accordance with a first set of preselected instructions and as determined by said data;

secondary control means for receiving said data and for producing override command signals to be used for the attenuation of forces between the members in accordance with a second set of preselected instructions and as determined by said data;

means responsive to said primary and override command signals for producing damper command signals which are a function of said primary and override command signals at times when an increased possibility of end-stop collisions is present, so as to minimize the incidence of said end-stop collisions.

12. The apparatus of claim 11 wherein said damper command signal means produces said damper command signals which are equal to the greater of said primary command and said override command signals.

13. The apparatus of claim 11 wherein said damper command signal means produces said damper command signals which are equal to the sum of said primary command and said override command signals.

14. The apparatus of claim 11 wherein said damper command signal means produces said damper command signals which are equal to the sum of a weighted percentage of said primary command and said override command signals.

* * * * *